Nov. 8, 1960  D. O. HOWARD ET AL  2,959,295
HOLDER FOR GUNS, FISHING RODS AND THE LIKE
Filed June 18, 1959

DALE O. HOWARD
Le ROYCE COMES
INVENTORS

BY *Mason, Patro, Miller & Stewart*

ATTORNEYS

United States Patent Office 2,959,295
Patented Nov. 8, 1960

2,959,295
HOLDER FOR GUNS, FISHING RODS AND THE LIKE

Dale O. Howard, 259 E. Truman Ave., and Le Royce Comes, 130 E. Whitlock Ave., both of South Salt Lake, Utah Filed June 18, 1959, Ser. No. 821,302

3 Claims. (Cl. 211—64)

This specification relates to novel improvements in a holder for guns, fishing rods and the like, adaptable for use for many purposes and under diverse conditions.

Considerable danger to personnel, and also likelihood of damage to hunting and fishing equipment results when no suitable means is provided for holding equipment in the field. It is of course well recognized that a rifle or shotgun may be quite dangerous if it is set aside where it is likely to be struck or knocked down by passers-by. In like manner injury may be caused by carelessly leaving a fishing rod, ax, or the like, where it may be in a person's way.

The present invention is addressed to the problem of providing a satisfactory and adequate facility for holding such articles so that they will not be dangerous or subject to damage.

One of the objects of our invention is to provide a holder which may be readily attached to a support such as the fender of an automobile, so that a convenient place may be provided for keeping firearms, fishing rods and axes or other outing tools.

A further object of the invention is to provide a holder which will keep the equipment from damage or deterioration in the field.

A still further object of the invention is to provide a holder which will be suitable for equipment of all sizes and kinds.

The above and other objects of the invention will be readily understood from the following description of the preferred form as illustrated by way of example on the accompanying drawings in which Fig. 1 is a side elevation of the novel rack attached to an automobile;

Figure 1:
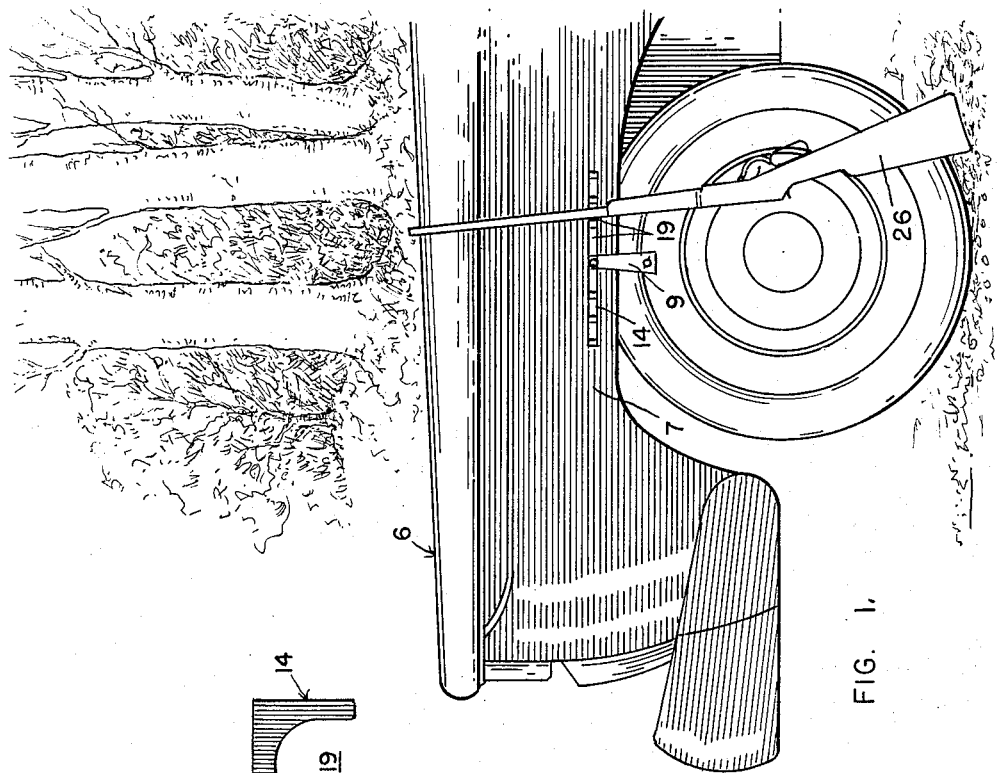
Figure 2:
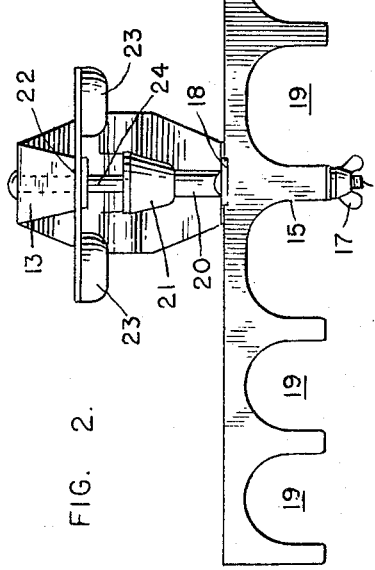
Fig. 2 is an enlarged plan view of the rack.
Figure 3:
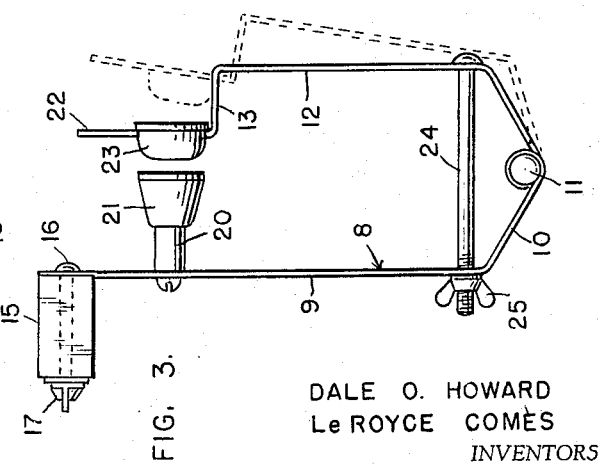
Fig. 3 is a similar end elevation of the same.

Essentially, the invention consists in a holder which may be readily carried in compact form, but can be opened out and fastened to any convenient support. Such a support may be part of a fence, a tent, or the convenient fender of an automobile. The holder is readily applied and provides adequately for receiving and holding an article such as a gun, a fishing rod, or the like, which may be fastened in position by lashing with any convenient rope or the like.

The invention has been shown as a holder applied to the side wall of an automobile 6, specifically to the fender 7, where cut away over one of the wheels.

The holder is attached by means of a hinged clamp 8. This may be detachably fixed to the edge of the fender 7, as illustrated. The clamp consists of a front standard 9, running vertically with the upper end free. The lower end of the standard has an offset foot 10 ending in a hinge 11.

A rear standard 12 also extends vertically opposite the front standard 9. The rear standard is attached to the front standard 9. The rear standard is attached to the hinge 11, and at its upper end has an offset end or extension 13.

The hinged clamp is of metal and similar to the ordinary strap hinges used in building construction and the like.

A horizontal rack 14 of wood, light metal, plastic or the like, has a transverse cross rib 15. This rib is drilled transversely for receiving a bolt 16, carrying a wing nut 17.

The rear face of the crossbar 14 is notched as shown at 18. This notch conforms to the width of the front standard 9. When the cross bar is loosely held, it may take a position parallel to the standard 9 for packing or carrying. However, for its ultimate use, the cross bar is turned at right angles to the standard 9, in which position the notch 18 receives the standard 9. Tightening the wing nut 17 clamps the cross bar firmly so that it will remain at right angles to the front standard.

The front edge of the cross bar 14 is cut away to provide a plurality of recesses 19 of various widths to accommodate articles of varying cross-sectional dimensions.

The rear face of the front standard 9 carries an abutment 20 in the form of a block or rod. This is generally round and terminates in a cushion 21.

The rear standard 12 extends vertically to provide a forward offset extension or end 22. This extension 22 is in the direction toward the front standard 9. The offset 22 carries two spaced pads 23, 23 opposite the cushion 21. The cushion and pads are made of flexible material such as rubber, plastic, textile or the like.

The two standards 9 and 12 are free to move away from each other on the hinge 11. However, to hold them in clamping position on opposite sides of the fender 7, a clamping bolt 24 is provided. This bolt runs through the standards 9 and 12 at their lower portions. A wing nut 25 on the bolt 24 will serve to pull the standards together, thus applying tension. The standards being of resilient material are thus held under tension on the fender 7 or other support.

It will be readily understood that with the clamp established by the standards 9 and 12, the crossbar is fixed in horizontal position to receive various objects of equipment. For example, a gun 26 resting on the ground as shown in Fig. 1, can be fixed with the barrel fastened in one of the recesses 19 by lashing with a rope or the like. Normally the implement will lean in the recess without further attention. However, a strap, cord or the like may readily be applied to hold the gun or other object within the recess.

The holder thus described is readily adaptable for attachment on any horizontal support. It will securely hold objects such as guns, fishing rods and the like. By suitable use of straps, cords and the like, swinging objects such as hand axes, utensils and the like can also be held free from support on the ground.

While the invention has been described and illustrated by way of example, it can be made with wide variations of material and proportions within the scope of the invention as defined in the following claims.

What we claim is:

1. A detachable holder for guns and the like comprising a jointed clamp having front and rear standards connected by a hinge pen, a transverse rack bar detachably secured to the front standard, a rearwardly extending abutment on the front standard, an oppositely positioned cushion on the rear standard and a tension member between the standards.

2. A detachable holder for guns and the like comprising a jointed clamp adapted to be fastened to a vehicle fender or the like, said clamp having front and rear standards, each standard having a lower portion bent inwardly and connected by a hinge pin, tension means between said standards, a transverse rack detachably mounted on the upper end of the front standard, an abutment extending inwardly from the front standard, the rear standard having an upper forwardly extending offset and a cushion on said offset opposite said abutment.

3. A detachable holder for guns and the like, comprising a jointed clamp adapted to be fastened to a vehicle fender or the like, said clamp having a front standard, a rack having a transverse recess in its rear face to receive the said standard, means for detachably fastening said standard in said recess, a rear standard, a hinge pin for connecting said standards at their bottom edges, cushion means on the opposing faces of said standards and means for clamping said standards.

References Cited in the file of this patent

UNITED STATES PATENTS

| | | |
|---|---|---|
| 1,192,251 | Wilson | July 25, 1916 |
| 2,158,623 | Fischbacher | May 16, 1939 |
| 2,287,485 | Pierce | June 23, 1942 |
| 2,549,391 | Secord | Apr. 17, 1951 |
| 2,855,108 | Haapala | Oct. 7, 1958 |